United States Patent [19]
Sakai

[11] Patent Number: 4,614,409
[45] Date of Patent: Sep. 30, 1986

[54] FINDER OPTICAL SYSTEM
[75] Inventor: Yutaka Sakai, Ohmiya, Japan
[73] Assignee: Fuji Photo Optical Co., Ltd., Tokyo, Japan
[21] Appl. No.: 658,595
[22] Filed: Oct. 9, 1984
[30] Foreign Application Priority Data Jul. 23, 1984 [JP] Japan ................... 59-15238

[51] Int. Cl.$^4$ ............... G02B 17/00; G02B 25/00
[52] U.S. Cl. ................................ 350/410
[58] Field of Search ........................ 350/410
[56] References Cited
U.S. PATENT DOCUMENTS 4,066,339  1/1973  Shoemaker ............... 350/410

Primary Examiner—John K. Corbin
Assistant Examiner—Rebecca D. Gass
Attorney, Agent, or Firm—Pasquale A. Razzano

[57] ABSTRACT

A finder optical system for a single-lens reflex camera has an eyepiece comprising in order from the viewing end thereof a negative lens consisting of a single negative lens or of a composite lens comprised of a positive lens and a negative lens, and a positive lens group consisting of two or more lens subgroups one of which constitutes a composite lens formed of a positive lens and a negative lens, wherein the overall length L and the focal length f of the eyepiece satisfy the relationship $0.65 < f/L < 0.9$. The finder optical system is suitable for use in a single-lens reflex camera having a small picture size since it enables the focal length of the eyepiece to be kept short and the image magnification high even in the case where the overall length of the eyepiece is great.

6 Claims, 3 Drawing Figures

FINDER OPTICAL SYSTEM

BACKGROUND OF THE INVENTION

1. Field of the Invention

This invention relates to a finder optical system, and more specifically to a finder optical system for a single-lens reflex camera.

2. Description of the Prior Art

The picture quality obtainable with silver-salt photosensitive materials has in recent years been improved to such an extent that it is now practicable to employ disk films with a format as small as 8 by 11 mm. Moreover, there have been marketed and announced video and electronic cameras employing image pickup tubes and solid-state image pickup devices rated as small as ⅔" and ½". As the picture size of these cameras is smaller than the 24 by 36 mm size of the 35 mm camera, it is necessary for the purpose of obtaining high image magnification to make the focal length of the eyepiece as short as possible so as to increase its magnification as a loupe. Particularly in the case of a camera using an image pickup tube or solid-state image pickup device, however, it is not possible to locate the eyepiece immediately behind the prism since a considerable amount of space is inevitably taken up by electronic circuitry, the drive section, the image recording section and the like. Therefore, when an eyepiece of conventional construction like that shown in FIG. 1 is used, it can be located in the desired position only if its focal length is made long and it therefore becomes impossible to avoid a reduction in image magnification. For example, taking D/f (where D is the diagonal length of the picture plane and f is the focal length of the eyepiece) as an index of the image magnification, in the ordinary single-lens reflex camera where D=43.2 and f=58, it is possible to obtain a value of D/f of approximately 0.74, whereas when the same construction is used in a ⅔" video camera, the result becomes D/f=11/58≈0.19. In the latter case, therefore, the image magnification becomes very small and is totally unsatisfactory. For practical purposes it is necessary to realize a value of D/f of not less than around 0.4.

SUMMARY OF THE INVENTION

The object of this invention is to provide a finder optical system for a single-lens reflex camera wherein the focal length of the eyepiece can be kept short and the image magnification high even in the case where the overall length of the eyepiece is great.

The above object of the present invention is accomplished by providing a finder optical system for a single-lens reflex camera comprising, from the viewing end, a negative lens consisting of a single negative lens or of a composite lens comprised of a positive lens and a negative lens, and a positive lens group consisting of two or more lens subgroups one of which consitutes a composite lens formed of a positive lens and a negative lens, wherein the overall length L and the focal length f of the eyepiece satisfy the relationship $0.65 < f/L < 0.9$.

DETAILED DESCRIPTION OF THE INVENTION

The present invention will hereinbelow be described in further detail with reference to FIGS. 2 and 3.

Figure 1:
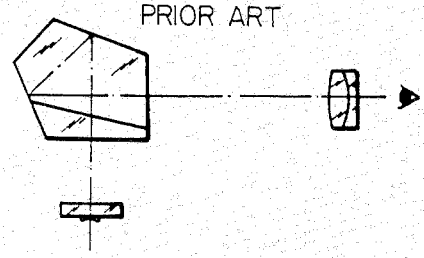
FIG. 1 is a simplified schematic view of a conventional finder optical system for a single-lens reflex camera.
Figure 2:
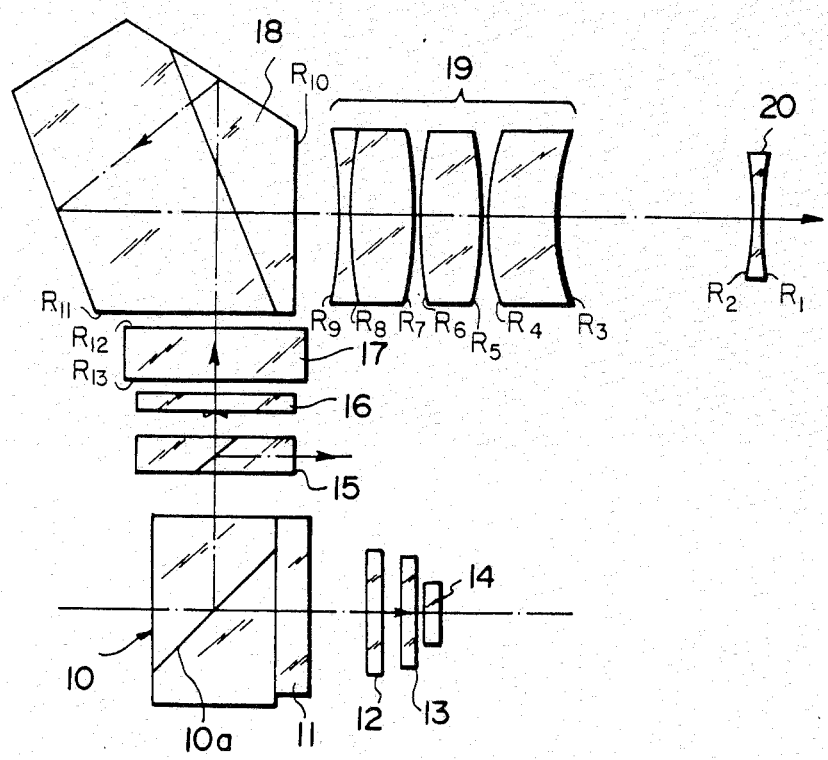
FIG. 2 is a schematic view of one embodiment of the finder optical system according to this invention.
Figure 3:
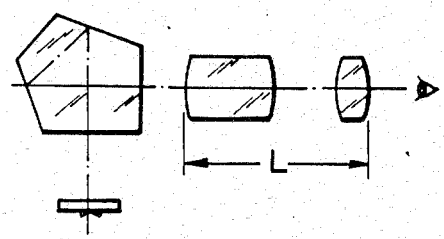
FIG. 3 is an explanatory view for demonstrating the effect of the present invention.

In FIG. 2, part of the image-carrying light from an object entering through an image pickup lens (not shown) transmits through the semitransparent film 10a of a semitransparent prism 10, a low pass filter 11, an infrared cut filter 12 and a protective glass 13 to impinge on a solid-state image pickup device 14. The image pickup device 14 is, for example, of the CCD or CID type and has a diagonal length of not more than 11 mm. Obviously, the solid-state image pickup device 14 can, if desired, be replaced with an image pickup tube. The solid-state image pickup device 14 is of course connected with a driver circuit, an oscillator, a preprocessor and other signal processing circuitry as well as with a magnetic head or the like for recording its output in the form of magnetic signals on a magnetic disk or video tape. As, however, these components are beyond the contemplation of the present invention, they are not shown in the drawings and will not be discussed here.

The remaining part of the light entering through the image pickup lens is reflected by the semitransparent film 10a and directed into a prism 15 which divides it into two beams, one of which is deflected toward the photoreceptor of a light meter (not shown) and the other of which passes through the prism 15 to form an image on a focal plate 16 located at a position approximately equivalent to that of the image pickup plans. As shown in the figure, the image-carrying light is further transmitted through a glass block 17 serving as an optical path length compensator, whereafter it enters a pentagonal prism 18 by which it is deflected from the roof face A of the prism for observation by the viewer as a finder image via an achromatic lens group 19 of positive power and a lens 20 of negative power.

When the operability of the camera and the physical design requirements of the camera interior are taken into consideration, it is clear that in the above-described arrangement the physical distance between the focal plate 16 and the negative lens 20 must be at least as long as that in the conventional single-lens reflex camera using silver-salt type photographic film. This necessity precludes the use of a lens with a short focal length and works to reduce the value of D/f. Here, if as shown in the table below, for example, there is used a retrofocus type eyepiece consisting of the lens 20 of negative power and the achromatic lens group 19 of positive power disposed in the order mentioned from the viewing and, the focal length is kept short and it becomes possible to increase the magnification while at the same time employing a long back focus to secure an adequate physical length. Moreover, in this embodiment the pentagonal prism 18 is oriented so that the incident light enters from the opposite prism face as compared with the conventional arrangement in an ordinary 35 mm camera. This orientation results in a smaller image surface so that the prism itself can be made smaller, which is advantageous from the point of reduced weight and cost.

Next, the meritorious effect or results of the invention will be explained in terms of numerical values. Defining the overall length L of the eyepiece as shown in FIG. 3 and designating the focal length of the eyepiece as f, the loupe magnification of the eyepiece and consequently the image magnification will increase as f/L becomes smaller.

Table 1 shows a comparison between Embodiments 1–3 of the present invention and Japanese unexamined Utility Model Publication Nos. 48(1973)-32325 (Prior Art A) and 48(1973)-10424 (Prior Art B). As will be noted, the eyepiece according to the present invention has an extremely short focal length for its overall length. The value f=25.0 attained in these embodiments means that when the eyepiece is applied to a ⅔″ electronic camera (diagonal of picture frame: 11 mm), there will be obtained a picture angle index D/f of 0.44, which is adequate to satisfy the object of this invention.

TABLE 1

|  | Embodiment | | | Prior Art A | Prior Art B |
|---|---|---|---|---|---|
|  | 1 | 2 | 3 | | |
| f | 25.0 | 25.0 | 25.0 | 76.7 | 75.0 |
| L | 29.9 | 33.28 | 35.65 | 22.5 | 17.9 |
| f/L | 0.836 | 0.751 | 0.701 | 3.41 | 4.18 |

First Embodiment

| Surface | r | Center thickness or interval | Nd | ν | Ref. No. in FIG. 2 |
|---|---|---|---|---|---|
| 1 | −19.036 | | | | |
| | | 1.0 | 1.8023 | 46.7 | 20 |
| 2 | 49.712 | | | | |
| | | 9.0 | | | |
| 3 | −23.402 | | | | |
| | | 4.5 | 1.6204 | 60.3 | |
| 4 | −17.953 | | | | |
| | | 0.2 | | | |
| 5 | 85.324 | | | | |
| | | 7.0 | 1.5891 | 61.2 | 19 |
| 6 | −33.280 | | | | |
| | | 0.2 | | | |
| 7 | 31.250 | | | | |
| | | 7.0 | 1.6204 | 60.3 | |
| 8 | −47.438 | | | | |
| | | 1.0 | 1.8052 | 25.5 | |
| 9 | 623.190 | | | | |
| | | 3.0 | | | |
| 10 | ∞ | | | | |
| | | 58.0 | 1.6825 | 44.5 | 18 |
| 11 | ∞ | | | | |
| | | 0.5 | | | |
| 12 | ∞ | | | | |
| | | 5.7 | 1.5750 | 41.3 | 17 |
| 13 | ∞ | | | | |

Second Embodiment

| Surface | r | Center thickness or interval | Nd | ν | Ref. No. in FIG. 2 |
|---|---|---|---|---|---|
| 1 | −20.281 | | | | |
| | | 1.0 | 1.8023 | 46.7 | 20 |
| 2 | 44.891 | | | | |
| | | 10.88 | | | |
| 3 | −27.457 | | | | |
| | | 6.0 | 1.5891 | 61.2 | |
| 4 | −18.746 | | | | |
| | | 0.2 | | | |
| 5 | 66.667 | | | | |
| | | 7.0 | 1.5891 | 61.2 | 19 |
| 6 | −43.044 | | | | |
| | | 0.2 | | | |
| 7 | 31.928 | | | | |
| | | 7.0 | 1.6204 | 60.3 | |
| 8 | −60.887 | | | | |
| | | 1.0 | 1.8052 | 25.5 | |
| 9 | 140.911 | | | | |
| | | 3.0 | | | |
| 10 | ∞ | | | | |
| | | 59.8 | 1.6825 | 44.5 | 18 |
| 11 | ∞ | | | | |
| | | 0.5 | | | |
| 12 | ∞ | | | | |
| | | 5.7 | 1.5750 | 41.3 | 17 |
| 13 | ∞ | | | | |

Third Embodiment

| Surface | r | Center thickness or interval | Nd | ν | Ref. No. in FIG. 2 |
|---|---|---|---|---|---|
| 1 | −18.180 | | | | |
| | | 2.5 | 1.8052 | 25.5 | |
| 2 | −17.376 | | | | 20 |
| | | 0.75 | 1.8023 | 46.7 | |
| 3 | 454.545 | | | | |
| | | 12.0 | | | |
| 4 | −31.466 | | | | |
| | | 4.0 | 1.5891 | 61.2 | |
| 5 | −21.210 | | | | |
| | | 0.2 | | | |
| 6 | 55.654 | | | | |
| | | 1.0 | 1.8052 | 25.5 | |
| 7 | 26.548 | | | | 19 |
| | | 10.0 | 1.6204 | 60.3 | |
| 8 | −48.638 | | | | |
| | | 0.2 | | | |
| 9 | 31.250 | | | | |
| | | 5.0 | 1.6204 | 60.3 | |
| 10 | 109.496 | | | | |
| | | 3.0 | | | |
| 11 | ∞ | | | | |
| | | 59.8 | 1.6825 | 44.5 | 18 |
| 12 | ∞ | | | | |
| | | 0.5 | | | |
| 13 | ∞ | | | | |
| | | 5.7 | 1.5750 | 41.3 | 17 |
| 14 | ∞ | | | | | f = 25.0
Picture size: 6.6 × 8.8

I claim:

1. In a finder optical system for a single-lens reflex camera of the type wherein an image produced by an image pickup lens is viewed through an erect prism and an eyepiece, the improved finder optical system comprising, from the viewing end of the eyepiece, a negative lens, and a positive lens group consisting of at least two lens subgroups one of which constitutes a composite lens formed of a positive lens and a negative lens, wherein the overall length L and the focal length f of the eyepiece satisfy the relationship $0.65 < f/L < 0.9$.

2. A finder optical system as defined in claim 1 wherein the erect prism is a pentagonal prism and its first reflecting face as seen from the viewing end of the eyepiece is a roof face.

3. A finder optical system as defined in claim 1 wherein the following conditions are satisfied where r, d, Nd and ν, respectively, designate the radii of curvature of the refracting surfaces, the axial air separation or thickness of lenses, the refractive indices for the sodium d-line and the Abbe dispersion numbers numbered in order from front to rear;

| surface | r | d | Nd | ν |
|---|---|---|---|---|
| 1 | −19.036 | | | |
| | | 1.0 | 1.8023 | 46.7 |
| 2 | 49.712 | | | |
| | | 9.0 | | |
| 3 | −23.402 | | | |
| | | 4.5 | 1.6204 | 60.3 |
| 4 | −17.953 | | | |
| | | 0.2 | | |
| 5 | 85.324 | | | |
| | | 7.0 | 1.5891 | 61.2 |
| 6 | −33.280 | | | |
| | | 0.2 | | |

-continued

| surface | r | d | Nd | ν |
|---|---|---|---|---|
| 7 | 31.250 | | | |
| | | 7.0 | 1.6204 | 60.3 |
| 8 | −47.438 | | | |
| | | 1.0 | 1.8052 | 25.5 |
| 9 | 623.190 | | | |
| | | 3.0 | | |
| 10 | ∞ | | | |
| | | 58.0 | 1.6825 | 44.5 |
| 11 | ∞ | | | |
| | | 0.5 | | |
| 12 | ∞ | | | |
| | | 5.7 | 1.5750 | 41.3 |
| 13 | ∞ | | | |

4. A finder optical system as defined in claim 1 wherein the following conditions are satisfied where r, d, Nd and ν, respectively, designate the radii of curvature of the refracting surfaces, the axial air separation or thickness of lenses, the refractive indices for the sodium d-line and the Abbe dispersion numbers numbered in order from front to rear;

| surface | r | d | Nd | ν |
|---|---|---|---|---|
| 1 | −20.281 | | | |
| | | 1.0 | 1.8023 | 46.7 |
| 2 | 44.891 | | | |
| | | 10.88 | | |
| 3 | −27.457 | | | |
| | | 6.0 | 1.5891 | 61.2 |
| 4 | −18.746 | | | |
| | | 0.2 | | |
| 5 | 66.667 | | | |
| | | 7.0 | 1.5891 | 61.2 |
| 6 | −43.044 | | | |
| | | 0.2 | | |
| 7 | 31.928 | | | |
| | | 7.0 | 1.6204 | 60.3 |
| 8 | −60.887 | | | |
| | | 1.0 | 1.8052 | 25.5 |
| 9 | 140.911 | | | |
| | | 3.0 | | |
| 10 | ∞ | | | |
| | | 59.8 | 1.6825 | 44.5 |

-continued

| surface | r | d | Nd | ν |
|---|---|---|---|---|
| 11 | ∞ | | | |
| | | 0.5 | | |
| 12 | ∞ | | | |
| | | 5.7 | 1.5750 | 41.3 |
| 13 | ∞ | | | |

5. A finder optical system as defined in claim 1 wherein the following conditions are satisfied where r, d, Nd, and ν, respectively, designate the radii of curvature of the refracting surfaces, the axial air separation or thickness of lenses, the refractive indices for the sodium d-line and the Abbe dispersion numbers numbered in order from front to rear;

| surface | r | d | Nd | ν |
|---|---|---|---|---|
| 1 | −18.180 | | | |
| | | 2.5 | 1.8052 | 25.5 |
| 2 | −17.376 | | | |
| | | 0.75 | 1.8023 | 46.7 |
| 3 | 454.545 | | | |
| | | 12.0 | | |
| 4 | −31.466 | | | |
| | | 4.0 | 1.5891 | 61.2 |
| 5 | −21.210 | | | |
| | | 0.2 | | |
| 6 | 55.654 | | | |
| | | 1.0 | 1.8052 | 25.5 |
| 7 | 26.548 | | | |
| | | 10.0 | 1.6204 | 60.3 |
| 8 | −48.638 | | | |
| | | 0.2 | | |
| 9 | 31.250 | | | |
| | | 5.0 | 1.6204 | 60.3 |
| 10 | 109.496 | | | |
| | | 3.0 | | |
| 11 | ∞ | | | |
| | | 59.8 | 1.6825 | 44.5 |
| 12 | ∞ | | | |
| | | 0.5 | | |
| 13 | ∞ | | | |
| | | 5.7 | 1.5750 | 41.3 |
| 14 | ∞ | | | |

6. A finder optical system as defined in claim 1 wherein said negative lens is a single lens.

* * * * *